United States Patent
Beck et al.

(10) Patent No.: US 9,613,159 B2
(45) Date of Patent: Apr. 4, 2017

(54) SYSTEMS, METHODS, AND COMPUTER-READABLE MEDIA FOR INTEGRATING A FIT-TO-SIZE SCALE FACTOR IN A SEQUENCE OF SCALE FACTORS

(75) Inventors: Nils Beck, San Mateo, CA (US); Conrad Carlen, Burlingame, CA (US)

(73) Assignee: APPLE INC., Cupertino, CA (US)

( * ) Notice: Subject to any disclaimer, the term of this patent is extended or adjusted under 35 U.S.C. 154(b) by 1172 days.

(21) Appl. No.: 12/907,868

(22) Filed: Oct. 19, 2010

(65) Prior Publication Data

US 2012/0092378 A1  Apr. 19, 2012

(51) Int. Cl.
 G09G 5/00 (2006.01)
 G06F 17/30 (2006.01)
(52) U.S. Cl.
 CPC .............................. G06F 17/30905 (2013.01)
(58) Field of Classification Search
 None
 See application file for complete search history.

(56) References Cited

U.S. PATENT DOCUMENTS

| | | | | |
|---|---|---|---|---|
| 5,982,367 A | * | 11/1999 | Alimpich et al. | 715/810 |
| 6,456,305 B1 | * | 9/2002 | Qureshi et al. | 715/800 |
| 6,559,971 B1 | * | 5/2003 | Watts et al. | 358/1.2 |
| 7,177,045 B2 | * | 2/2007 | Goel et al. | 358/1.18 |
| 7,350,155 B2 | * | 3/2008 | White et al. | 715/800 |
| 7,912,829 B1 | * | 3/2011 | Mathes et al. | 707/707 |
| 2003/0103071 A1 | * | 6/2003 | Lusen et al. | 345/705 |
| 2005/0065851 A1 | * | 3/2005 | Aronoff et al. | 705/15 |
| 2005/0240756 A1 | * | 10/2005 | Mayer | 713/2 |
| 2006/0238628 A1 | * | 10/2006 | Vanhatalo | 348/240.99 |
| 2008/0021921 A1 | * | 1/2008 | Horn | 707/102 |
| 2008/0140722 A1 | * | 6/2008 | Jakobovits | 707/104.1 |
| 2008/0178125 A1 | * | 7/2008 | Elsbree et al. | 715/862 |
| 2010/0199214 A1 | * | 8/2010 | Mikawa | 715/800 |
| 2010/0241507 A1 | * | 9/2010 | Quinn et al. | 705/14.42 |

\* cited by examiner

*Primary Examiner* — Anh-Tuan V Nguyen
(74) *Attorney, Agent, or Firm* — Nicholas Panno; Page Ponsford; DLA Piper LLP US (57) ABSTRACT

Systems, methods, and computer-readable media are provided for integrating a fit-to-size scale factor in a sequence of scale factors. A fit-to-size scale factor can be determined based on original dimensions of information to be displayed and on dimensions of a window in which to display the information. The determined fit-to-size scale factor can be integrated in a listing of scale factors such that when a user steps through the sequence of scale factors, the user can select from the sequence the fit-to-size scale factor with which to display the information. In some cases, a autoresize mode can be seamlessly enabled such that the information may automatically scale to its fit-to-size scale factor when the window is re-sized.

20 Claims, 10 Drawing Sheets

| 500 |
|---|
| 30% |
| 40% |
| 50% |
| 60% |
| 75% |
| 77% - Fit |
| 90% |
| 100% |
| 110% |
| 125% |
| 150% |
| 200% |

512 → 77% - Fit
510 → 150%

FIG. 5

| 600 |
|---|
| 30% |
| 40% |
| 50% |
| 60% |
| 75% |
| 90% |
| 100% |
| 104% - Fit |
| 110% |
| 125% |
| 150% |
| 200% |

510 → 40%
512 → 104% - Fit

SYSTEMS, METHODS, AND COMPUTER-READABLE MEDIA FOR INTEGRATING A FIT-TO-SIZE SCALE FACTOR IN A SEQUENCE OF SCALE FACTORS

BACKGROUND

Some electronic devices can be used to display information to a user. For example, some electronic devices can display documents or other content on a display. Displayed information can be provided in one of several sizes, as determined from a scale factor applied to the information. For example, the information can be scaled relative to a pre-defined size established for the information. A user can change the scale of displayed information by selecting one of several scale factors. For example, a user can select plus and minus options for stepping through a sequence of scale factors. Alternatively, the user can enter a specific scale factor using an input interface. In addition to a user-selected scale factor, some electronic devices can include a distinct auto-resize mode in which information can be sized to match the size of a window in which the information is provided. When the auto-resize mode is enabled, resizing a window can cause the electronic device to change the scale factor used to ensure that the displayed information is re-scaled to fit in the re-sized window.

SUMMARY

Systems, methods, and computer-readable media for integrating a fit-to-size scale factor in a sequence of scale factors are provided.

An electronic device can display information in a window. The information can have any suitable size in the window, as determined from a scale factor that a user can change. In addition, a user can change the dimensions of the window. When the dimensions of the window are changed, the scale factor used for the information may remain the same. In a auto-resize mode, however, the scale factor can be selected such that a height or width of displayed information may match a height or width of the window (e.g., the scale factor can be selected as the largest scale factor that ensures that the entirety of the information is displayed in the window). While in a auto-resize mode, when the dimensions of a window are changed, the scale factor used may automatically change to reflect the change in size of the window for maintaining the auto-resize mode.

A user can change a scale factor for displayed information by stepping through a sequence of available scale factor options. To integrate a auto-resize mode in the provided scale factor options, the electronic device can identify a fit-to-size scale factor corresponding to fitting the information in the displayed window, and can incorporate the identified fit-to-size scale factor in a sequence of scale factor options provided to the user. Then, when a user steps through the sequence of scale factor options, the electronic device can seamlessly enable the auto-resize mode when the user-selected scale factor option is the fit-to-size scale factor, and can seamlessly disable the auto-resize mode when the user-selected scale factor option is not the fit-to-size scale factor.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which.

DETAILED DESCRIPTION

Systems, methods, and computer-readable media for integrating a fit-to-size scale factor in a sequence of scale factors are provided and described with reference to FIGS. 1-11.

Figure 1:
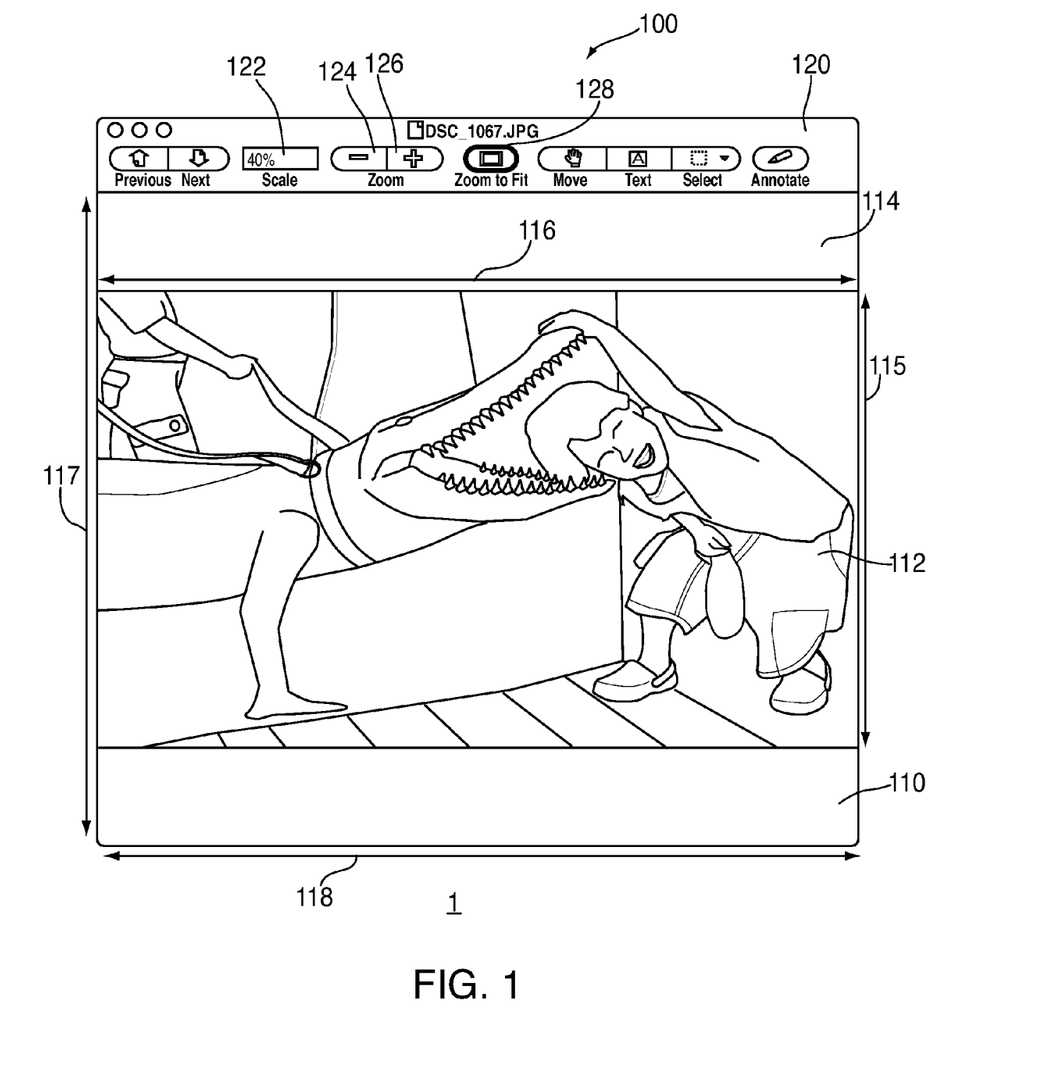
FIG. 1 is an illustrative view of a window in which information may be displayed in accordance with some embodiments of the invention.

An electronic device can display information in one or more windows of a display. Alternatively, an electronic device can display information in any other type of resizable canvas or region on a display. For the sake of simplicity, however, the following discussion will describe embodiments in the context of a window in which information is provided. The information can be displayed in any suitable size including, for example, a size determined from a scale factor. The scale factor can be defined as a percentage of the actual size of the information. For example, if the information is an image, the scale factor can include a percentage of the original image size as defined by the image's original dimensions (e.g., measured in pixels or in a distance unit). FIG. 1 is an illustrative view of a window in which information may be displayed in accordance with some embodiments of the invention. Display 100, provided by electronic device 1, can include window 110 in which information 112 (e.g., an image) may be displayed. Portions of window 110 that do not include displayed information 112 can include window background 114.

Display 100 can also include toolbar 120 with which a user can control the display of information 112. For example, toolbar 120 can include scale option 122 in which a currently used scale factor can be displayed, or in which a user can specify a particular scale factor to be used. The user can change the scale factor by selecting down option 124 and up option 126. In response to receiving a selection of one of options 124 and 126, electronic device 1 can change the scale factor used for displayed information 112. For example, the scale factor can change in accordance with a preset sequence of scale factors (e.g., 20%, 30%, 40%, 50%, 60%, 75%, 100%, 110%, 125%, 200%, 300%). In some cases, the sequence of scale factors can vary based on the original size of the information, a size of the window, or other factors.

Toolbar 120 can include fit-to-size option 128 by which electronic device 1 can display information 112 such that the entirety of height 115 of displayed information 112 may match the entirety of height 117 of window 110 and/or such that the entirety of width 116 of displayed information 112 may match the entirety of width 118 of window 110. In particular, electronic device 1 can select as a fit-to-size scale factor the largest possible scale factor that may be used such that the entirety of displayed information 112 may be provided in window 110 (e.g., the fit-to-size scale factor may be selected as the smaller of the scale factor required to match height 115 of displayed information 112 with the entirety of height 117 of window 110 and the scale factor required to match width 116 of displayed information 112 with the entirety of width 118 of window 110). While a auto-resize mode is enabled, as indicated by the selection of fit-to-size option 128, in response to any resizing of height 117 and/or width 118 of window 110, device 1 may also automatically change the fit-to-size scale factor for information 112 so that the entirety of one of height 115 and width 116 of displayed information 112 may match the resized height 117 and/or resized width 118 of a re-sized window 110.

Figure 2:
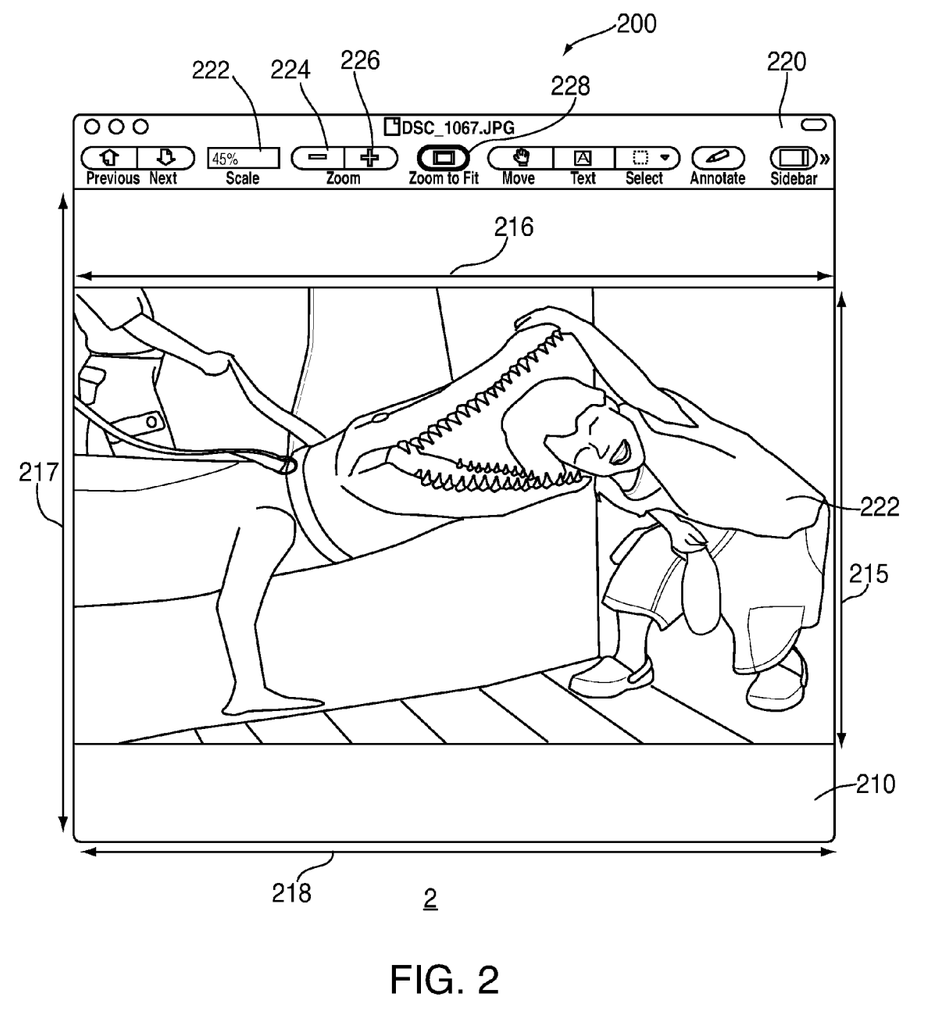
FIG. 2 is an illustrative view of a re-sized window in which information may be displayed in accordance with some embodiments of the invention.

FIG. 2 is an illustrative view of a re-sized window in which information may be displayed in accordance with some embodiments of the invention. Display 200 of device 2 can include window 210 and toolbar 220 that may have some or all of the features of the corresponding elements of display 100 of FIG. 1. In contrast with window 110 of display 100, window 210 may have been expanded. To ensure that at least one of height 215 and width 216 of displayed information 212 matches at least one of a respective expanded height 217 and expanded width 218 of window 210, the fit-to-size scale factor used for displayed information 212 can be automatically increased, for example, as indicated by scale option 222. In particular, the scale factor indicated by scale option 222 is 45%, as opposed to the 40% scale factor used in display 100. In addition, display 200 can indicate to a user that the auto-resize mode is still enabled by showing a selection of fit-to-size option 228.

Figure 3:
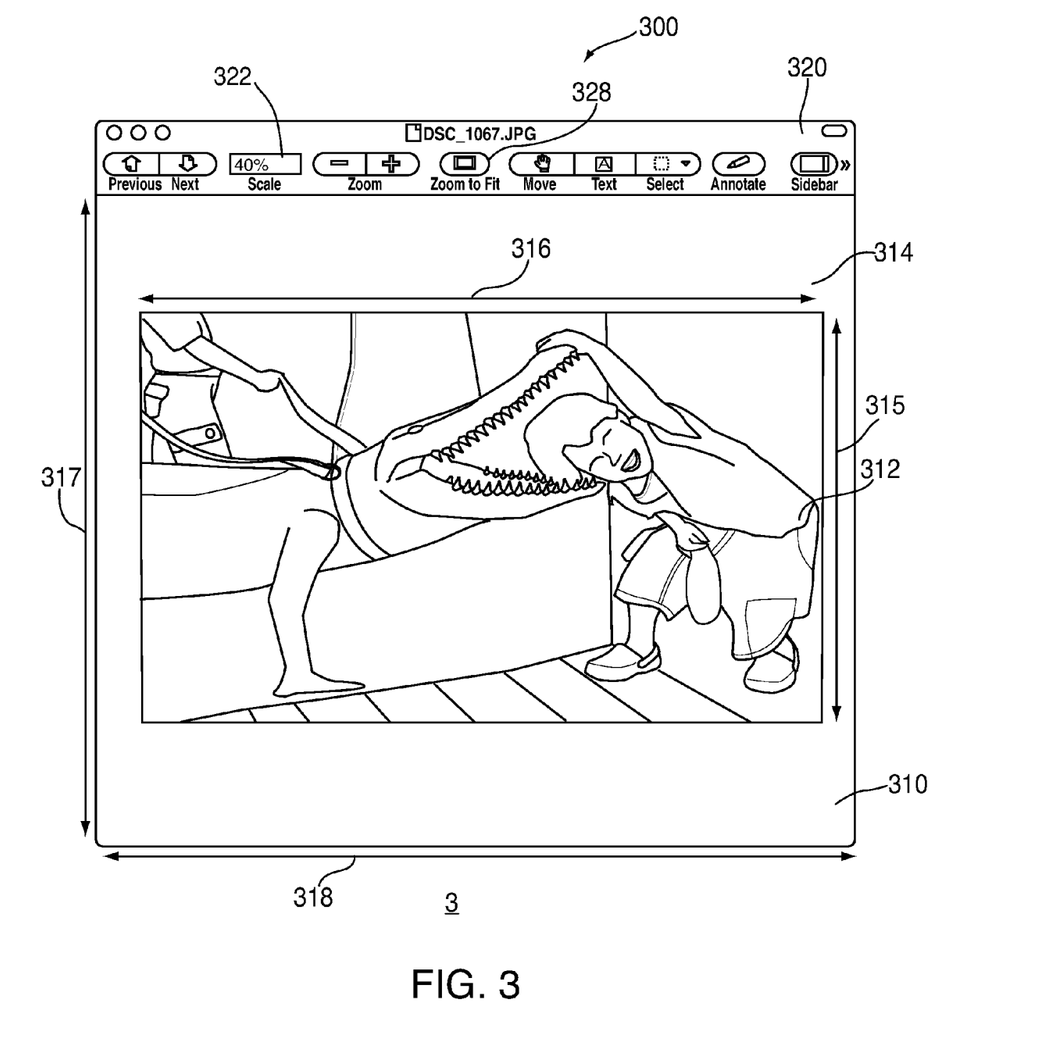
FIG. 3 is an illustrative view of a re-sized window in which information may be displayed in accordance with some embodiments of the invention.

In some cases, a user can change the scale factor for displayed content to a scale factor other than a fit-to-size scale factor. For example, a user can enter a scale factor in a scale option (e.g., scale option 222 of FIG. 2), or select an option for moving through a sequence of scale factors (e.g., down option 224 and up option 226 of FIG. 2) such that the resulting displayed information does not match the size of a displayed window. FIG. 3 is an illustrative view of a re-sized window in which information may be displayed in accordance with some embodiments of the invention. Display 300 of device 3 can include window 310 and toolbar 320, which can include some or all of the features of display 200 of FIG. 2. In contrast with information 212 displayed in window 210 of FIG. 2, displayed information 312 that may be displayed in window 310 can be provided at a scale factor such that height 315 of displayed information 312 does not match height 317 of window 310 and such that width 316 of displayed information 312 does not match width 318 of window 310. Instead, background 314 can be visible around the entire boundary of displayed information 312. The user can direct electronic device 3 to provide display 300 using any suitable approach including, for example, by directing device 3 to reduce the scale factor of displayed information 312 on display 300.

To further indicate to a user that information 312 is not scaled to fit window 310, fit-to-size option 328 in toolbar 320 may not be selected. The scale factor indicated in scale option 322 may differ from the scale factor in scale option 222 to reflect the change in size of displayed information 312. In particular, the scale factor indicated in scale option 322 can be 40%, while the scale factor indicated in scale option 222 of FIG. 2 can be 45%.

Figure 4:
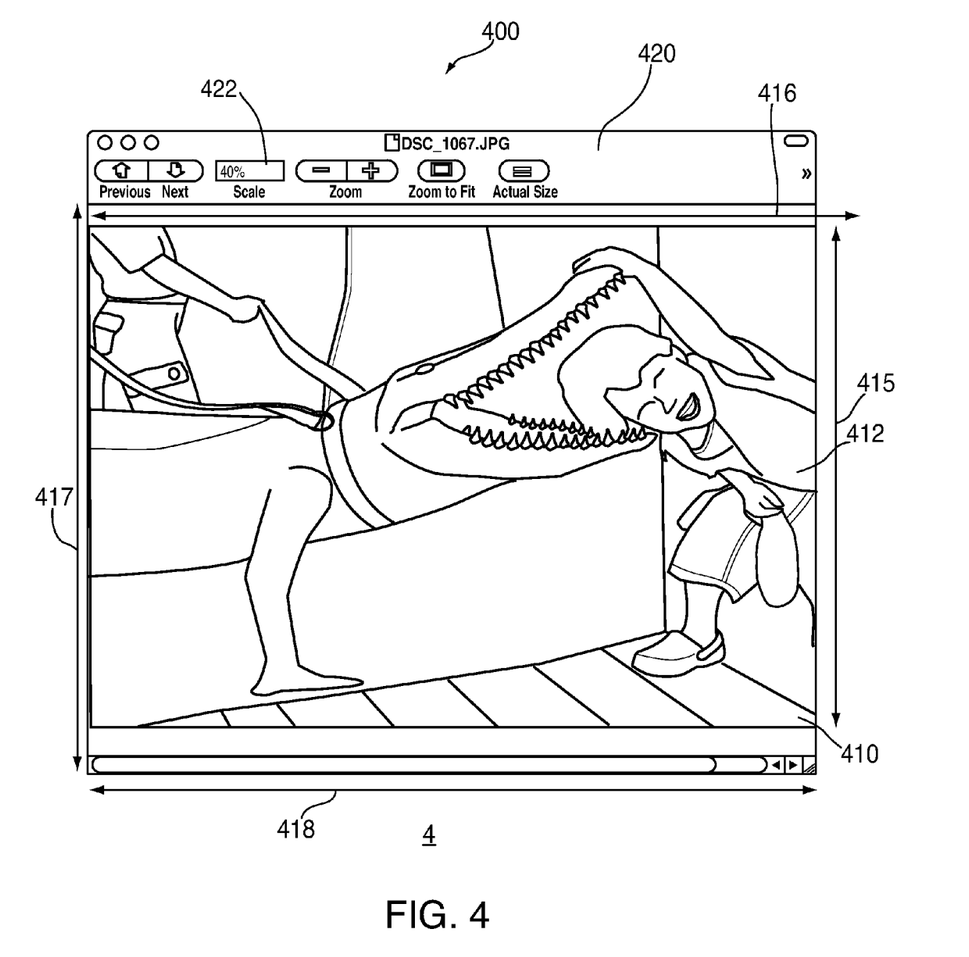
FIG. 4 is an illustrative view of the re-sized window of FIG. 3 in accordance with some embodiments of the invention.

When the auto-resize mode is disabled, the scale factor may remain constant when the window is re-sized. FIG. 4 is an illustrative view of the re-sized window of FIG. 3 in accordance with some embodiments of the invention. Display 400 of device 4 can include window 410 and toolbar 420, which can include some or all of the features of corresponding elements of display 300 of FIG. 3. When a user re-sizes window 410, the scale factor used for displayed information 412 can remain constant, as shown in scale option 422 of toolbar 420 (e.g., the scale factor is 40% for both option 322 of FIG. 3 and option 422 of FIG. 4). The amount of information 412 displayed, however, may be less than the amount of information 312 displayed in window 310 of FIG. 3. In particular, height 415 of displayed information 412 may be smaller than height 315 of displayed information 312. In addition, width 416 of displayed information 412 may be smaller than width 316 of displayed information 312, and the amount of information visible in width 416 may be less than the amount of the information visible in width 316 (e.g., because factor may not change when the window size scale changes). In particular, width 416 can be more than width 418 of window 410, though height 415 can be less than height 417 of window 410.

In some cases, a user can enter a scale factor by providing a scale factor directly in a scale option (e.g., scale option 122). In such cases, even if the provided scale factor matches a current fit-to-size scale factor, the electronic device may not enable the auto-resize mode. Instead, the electronic device can maintain the mode disabled to reflect the user input.

Figure 5:
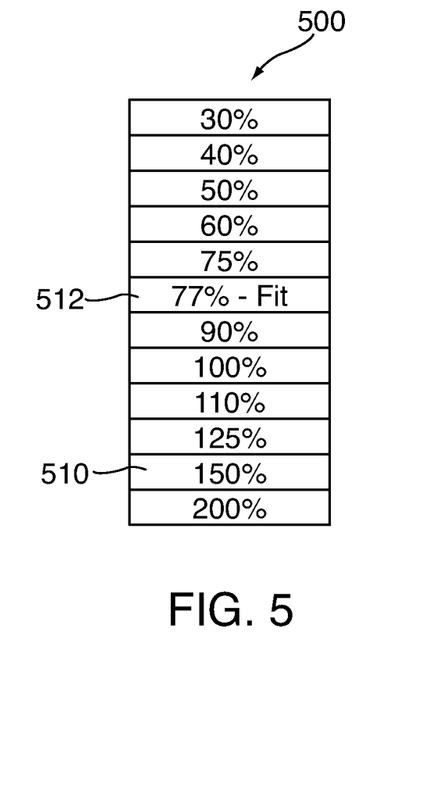
FIG. 5 is a schematic view of an illustrative sequence of scale factors through which an electronic device can cycle in response to instructions to change a scale factor in accordance with some embodiments of the invention.

To improve a user's interaction with displayed content, it may be desirable to integrate the auto-resize mode in the sequence of scale factors. In one approach, the electronic device can integrate a fit-to-size scale factor in a pre-defined sequence of scale factors corresponding to selectable scale up and scale down options. FIG. 5 is a schematic view of an illustrative sequence of scale factors through which an electronic device can cycle in response to instructions to change a scale factor in accordance with some embodiments of the invention. Sequence 500 can include individual scale factors 510 corresponding to a pre-defined sequence of scale factors. For example, sequence 500 can include scale factors offset by 10%, 15%, 25%, 50%, or combinations of these.

Figure 6:
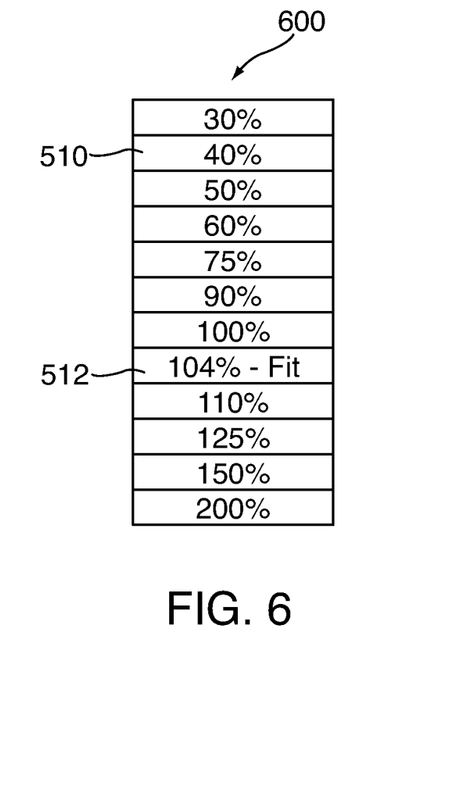
FIG. 6 is a schematic view of another illustrative sequence of scale factors through which an electronic device can cycle in response to instructions to change a scale factor in accordance with some embodiments.

In addition to the pre-defined sequence of scale factors 510, sequence 500 can include fit-to-size scale factor 512 integrated in sequence 500. The electronic device can determine fit-to-size scale factor 512 based on the original size of the information being displayed, and the size of the window in which the information is displayed. Once the fit-to-size scale factor has been determined, it can be integrated in a proper position in sequence 500 (e.g., such that sequence 500 is a consecutively ordered sequence of scale factors). If the window is re-sized or new information (e.g., information having a different original size) is displayed in a window, the fit-to-size scale factor can change. FIG. 6 is a schematic view of another illustrative sequence of scale factors through which an electronic device can cycle in response to instructions to change a scale factor in accordance with some embodiments. Sequence 600 can include the same set of pre-defined scale factors 610 as sequence 500 of FIG. 5, but a different fit-to-size scale factor 612 may replace the fit-to-size scale factor 512 of sequence 500 (e.g., 103% for fit-to-size scale factor 612 in sequence 600 may replace 77% for fit-to-size scale factor 512 in sequence 500). The particular position of the fit-to-size scale factor can change in sequence 600 relative to the position of the corresponding fit-to-size scale factor in sequence 500 due to the different value for the fit-to-size scale factor (e.g., such that the sequence values may be consecutive).

The electronic device can determine a current fit-to-size scale factor using any suitable approach. In some embodiments, the electronic device can preemptively determine a current fit-to-size scale factor based on a size of original information and a size of a window in which the information is displayed. The determined fit-to-size scale can then be integrated at an appropriate position in a sequence, as shown above in connection with FIGS. 5 and 6. Using this approach, a fit-to-size scale factor may be calculated each time a window is re-sized, and each time different information is displayed in the window.

Figure 7:
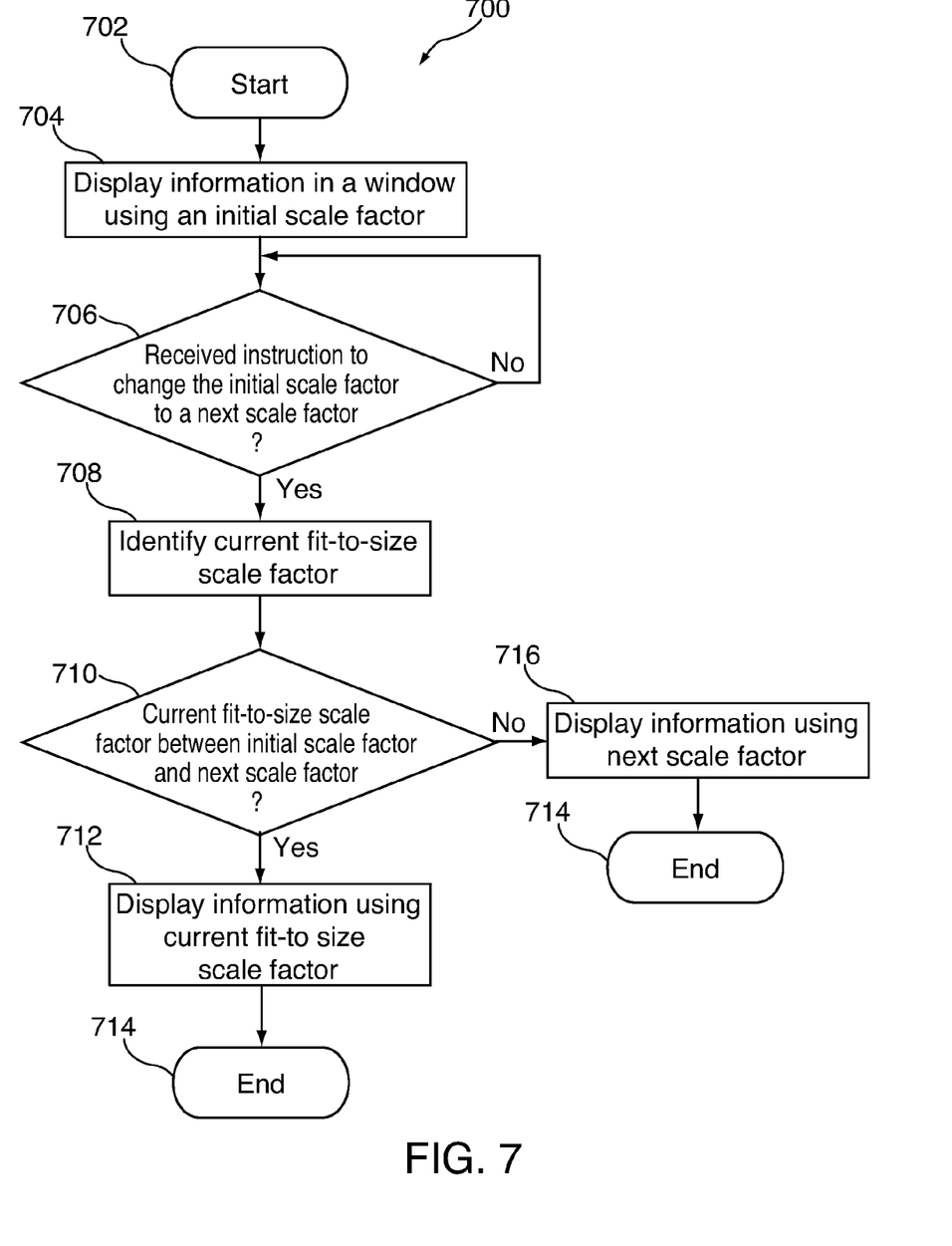
FIG. 7 is a flowchart of an illustrative process for integrating a fit-to-size scale factor in a sequence of scale factors in accordance with some embodiments of the invention.

Alternatively, the electronic device can determine a current fit-to-size scale factor each time a user provides an instruction to change a current scale factor for displayed information (e.g., when a user selects a scale factor up or down option), although the fit-to-size scale factor may not change each time the instruction is provided. FIG. 7 is a flowchart of an illustrative process for integrating a fit-to-size scale factor in a sequence of scale factors in accordance with some embodiments of the invention. Process 700 can begin at step 702. At step 704, information can be displayed using an initial scale factor. For example, an electronic device can display information in a window of a particular size, and using an initial scale factor. At step 706, the electronic device can determine whether an instruction to change the initial scale factor to a next scale factor in a sequence of scale factors has been received. For example, the electronic device can determine whether a selection of an option to scale up or scale down a scale factor was provided. If the electronic device determines that no instruction was received, process 700 can return to step 706 and continue to monitor for an instruction to change the current scale factor.

If, at step 706, the electronic device instead determines that an instruction to change the current scale factor to a next scale factor in a sequence of scale factors was provided, process 700 can move to step 708. At step 708, a current fit-to-size scale factor can be identified. For example, the electronic device can identify the largest scale factor that can be used such that the entire displayed information can fit within the window. At step 710, the electronic device can determine whether the identified current fit-to-size scale factor is between the initial scale factor and the next scale factor. For example, the electronic device can compare the identified current fit-to-size scale factor with the initial scale factor and the next scale factor. If the electronic device determines that the current fit-to-size scale factor is between the initial and next scale factors, process 700 can move to step 712. At step 712, the information can be displayed using the current fit-to-size scale factor. Process 700 can then end at step 714. If, at step 710, the electronic device instead determines that the current fit-to-size scale factor is not between the initial scale factor and the next scale factor in a sequence of scale factors, process 700 can move to step 716. At step 716, the information can be displayed using the next scale factor. Process 700 can then end at step 714.

In some cases, a auto-resize mode can be enabled, such that when the window is re-sized, the scale factor used may also change to maintain a fitted display of the information in the re-sized window. When information is displayed using a auto-resize mode, the scale factor can automatically change when a window in which the information is displayed is re-sized. In particular, a auto-resize mode can be seamlessly enabled when the scale factor used for displaying information is the fit-to-size scale factor. To ensure that information is automatically re-scaled in the auto-resize mode, a flag or variable can be set for the information. For example, a "sticky fit" variable or flag can be set for or associated with the information, by which an auto-resize mode can be enabled. Then, when the scale factor reaches its destination value (e.g. after an animation of the scale factor has concluded), the electronic device can detect the sticky fit variable, and enable the auto-resize mode if the scale factor matches the fit-to-size scale factor. Then, when the window in which the information is displayed is re-sized, the electronic device can detect the auto-resize mode, and automatically change the scale factor used for the information to maintain a fit-to-size appearance. The auto-resize mode can be disassociated with information when the scale factor is changed away from a fit-to-size scale factor.

Figure 8:
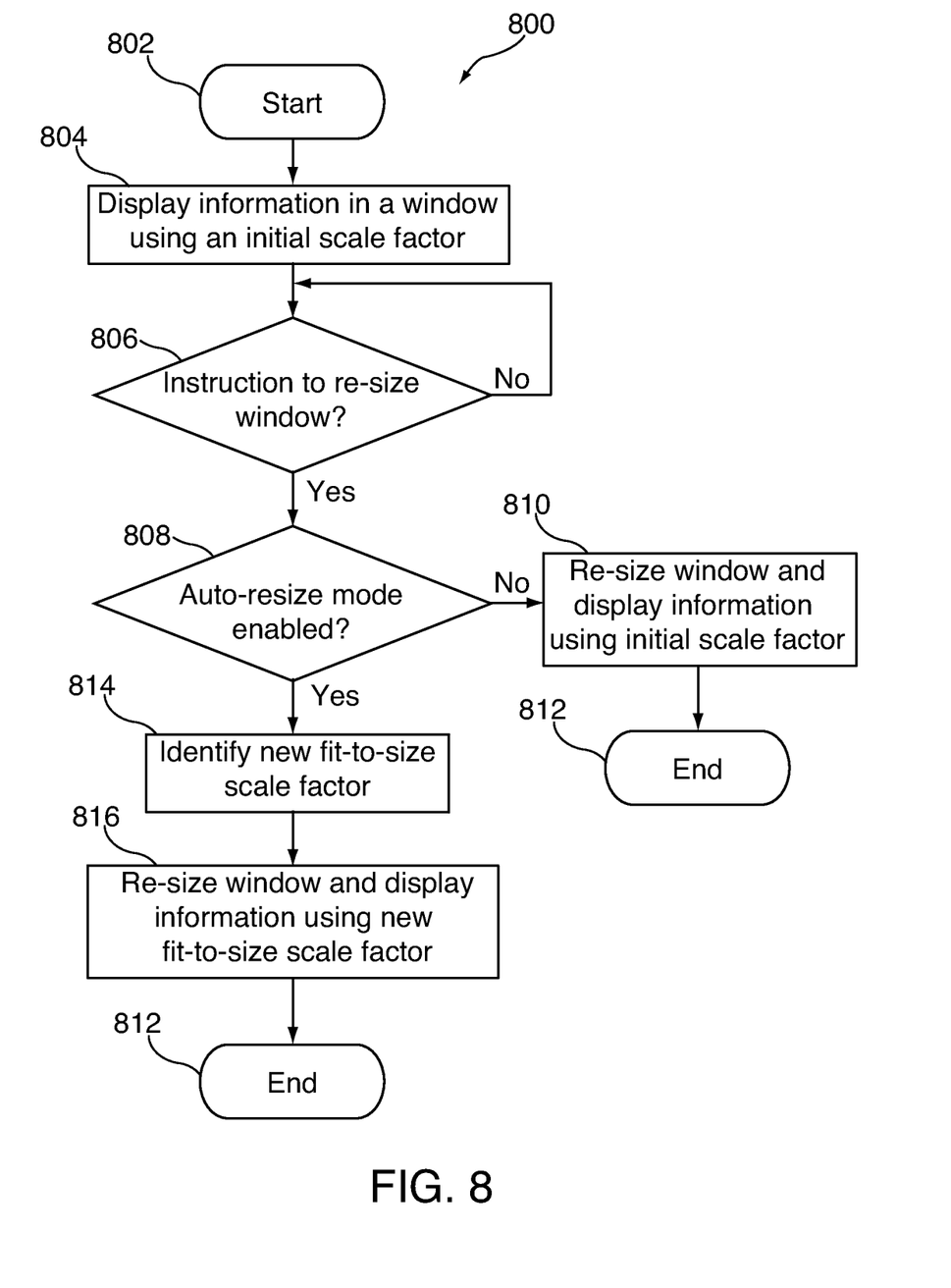
FIG. 8 is a flowchart of an illustrative process for detecting an auto-resize mode in accordance with some embodiments of the invention.

FIG. 8 is a flowchart of an illustrative process for detecting an auto-resize mode in accordance with some embodiments of the invention. Process 800 can begin at step 802. At step 804, information can be displayed using an initial scale factor. For example, an electronic device can display information in a window of a particular initial size, and using an initial scale factor. At step 806, the electronic device can determine whether an instruction to re-size the window has been received. For example, the electronic device can determine whether a selection and dragging of a corner of the window has been detected. If the electronic device determines that no instruction to re-size the window has been received, process 800 can return to step 806. If, at step 806, the electronic device instead determines that an instruction to re-size the window has been received, process 800 can move to step 808.

At step 808, an electronic device can determine whether an auto-resize mode is enabled. For example, the electronic device can determine whether a Boolean variable corresponding to a auto-resize mode is equal to "Yes." In some embodiments, before determining whether an auto-resize mode is enabled, an electronic device can first determine whether the initial scale factor corresponds to the fit-to-size scale factor for the information when displayed in the initial window size. If so, the device may proceed with determining whether an auto-resize mode is enabled. Otherwise, process 800 may proceed to step 810 without determining the status of the auto-resize mode. If the electronic device determines that the auto-resize mode has not been enabled, process 800 can move to step 810. At step 810, the window can be re-sized and information can be displayed in the re-sized window using the initial scale factor. Process 800 can then end at step 812. If, at step 808, the electronic device instead determines that an auto-resize mode is enabled, process 800 can move to step 814. At step 814, a new fit-to-size scale factor can be identified. For example, the electronic device can identify a new fit-to-size scale factor for the information that corresponds to the re-sized window. At step 816, the window can be re-sized and the information can be displayed in the re-sized window using the identified new fit-to-size scale factor. Process 800 can then end at step 812.

In some cases, the electronic device can support an animation of information as it changes from a first scale factor to a second scale factor. The sticky fit variable or flag associated with the information may be necessary to ensure that an auto-resize mode is properly enabled or disabled before and after the animation. For example, information can initially be displayed with a first scale factor, and a user can provide an instruction to display the information using a second scale factor. Before animating the information, the electronic device can disable the auto-resize mode, if enabled. This may be required, because no animation would be possible if the content remains fixed to boundaries of the window. A sticky fit variable can be set based on a manner in which the user provide the instruction to display the information using the scale factor. For example, the variable can be set to "yes" if the second scale factor was implicitly selected (e.g., selected using an up option), and the variable can be set to "no" if the second scale factor was explicitly selected (e.g., the user entered a value for the second scale factor). The electronic device can then smoothly animate the displayed information from the first scale factor the second scale factor, and upon reaching the second scale factor, check the sticky fit variable. If the sticky fit variable is set to "no," it may be left as "no" and the auto-resize mode may remain disabled. Alternatively, if the sticky fit variable is set to "yes," the second scale factor can be compared to the current fit-to-size scale factor. If they match, the auto-resize mode can be re-enabled, and the sticky fit variable can be set to "no." If they do not match, the auto-resize mode can remain disabled, and the sticky fit variable can be set to "no."

In some cases, the electronic device can integrate a fit-to-size scale factor in a sequence of scale factors associated with a continuous zooming instruction. For example, the electronic device can display information using a fit-to-size scale factor when a user provides an instruction, using a touch gesture or a scroll-wheel gesture, to step through a sequence of scale factors. In some cases, the electronic device can add a detent using the fit-to-size scale factor to indicate to a user that the fit-to-size scale factor is used (e.g., to increase a "target size" for user inputs corresponding to the fit-to-size scale factor). For example, the electronic device can add the fit-to-size scale factor to a sequence of detents associated with the information. The electronic device can, in some cases, automatically enable the auto-resize mode when information is displayed using the fit-to-size scale factor. If the information is displayed using a scale factor other than the fit-to-size scale factor, the electronic device can disable the auto-resize mode. Because the instruction to change the scale factor may be provided dynamically, the electronic device may not pre-define a sequence of scale factors. Instead, the scale factors can be determined in an ad-hoc manner, as the instruction is received.

Figure 9:
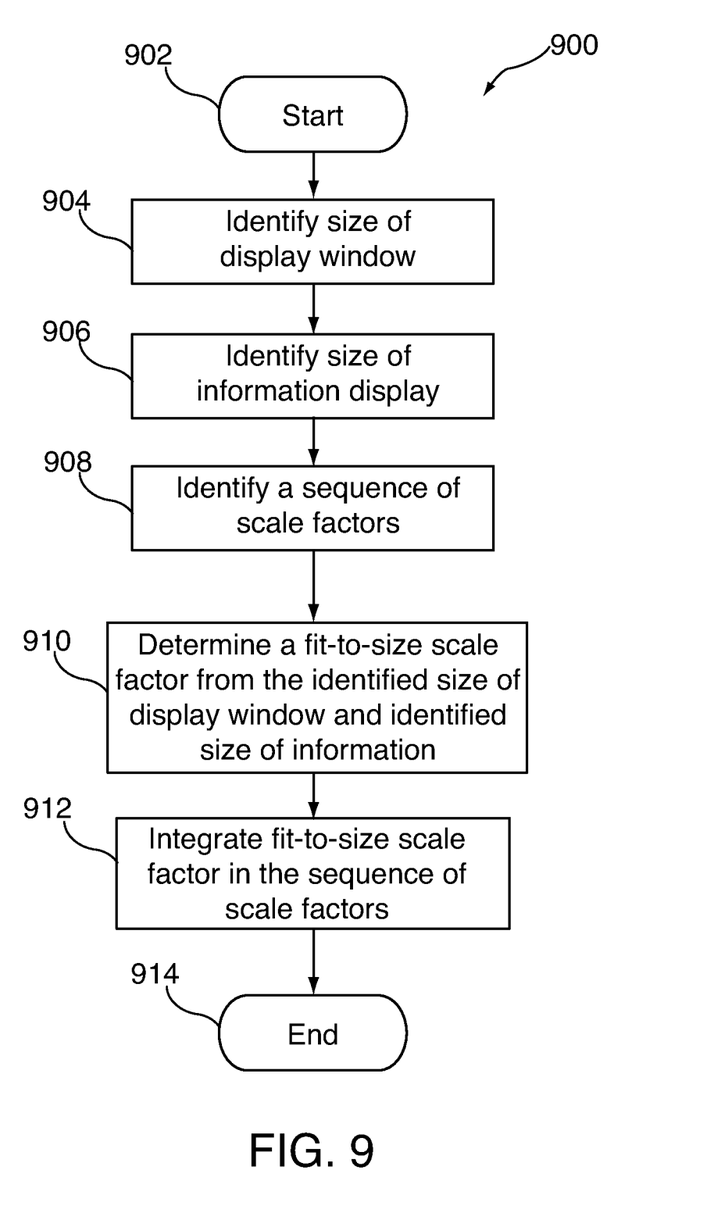
FIG. 9 is a flowchart of an illustrative process for integrating a fit-to-size scale factor in a sequence of scale factors in accordance with some embodiments of the invention.

FIG. 9 is a flowchart of an illustrative process for integrating a fit-to-size scale factor in a sequence of scale factors. Process 900 can begin at step 902. At step 904, a size of a display window can be identified. For example, an electronic device can identify dimensions of a window in which information is displayed. At step 906, an original size of the information to display can be identified. For example, the electronic device can identify dimensions associated with the information to display. At step 908, a sequence of scale factors can be identified. For example, the electronic device can identify various pre-defined scales at which information may be displayed, or the device can identify a sequence of scales in an ad-hoc manner. In some cases, the electronic device can step through the sequence of scale factors in response to receiving a corresponding instruction. At step 910, a fit-to-scale factor can be determined from the identified size of the display window and the identified original size of the information to display. For example, the electronic device can identify the largest scale factor by which the entirety of the information may be displayed in the window of the identified window size. At step 912, the determined fit-to-size scale factor can be integrated in the sequence of scale factors. For example, the fit-to-size scale factor can be integrated in consecutive numerical order in the sequence of scale factors. Process 900 can then end at step 914.

Figure 10:
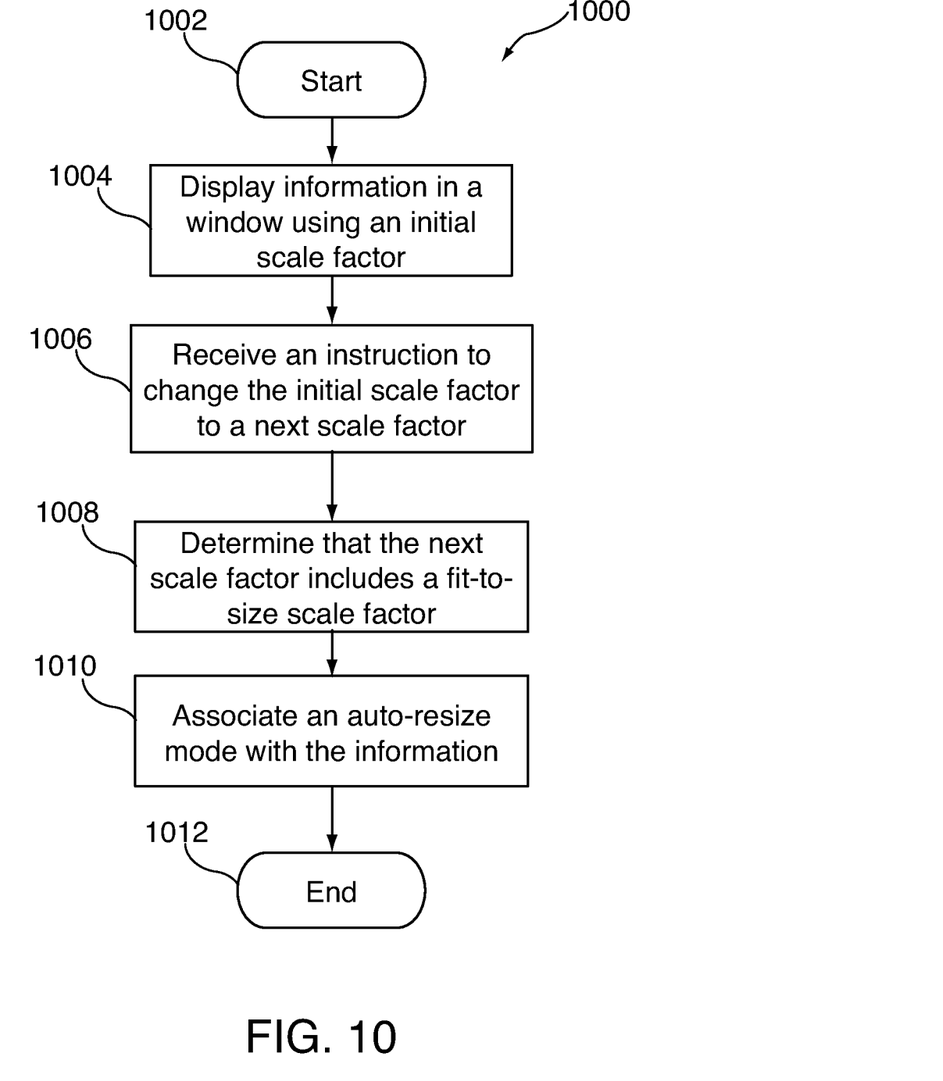
FIG. 10 is a flowchart of an illustrative process for iterating through a sequence of scale factors in accordance with some embodiments of the invention.

FIG. 10 is a flowchart of an illustrative process for iterating through a sequence of scale factors in accordance with some embodiments of the invention. Process 1000 can begin at step 1002. At step 1004, information can be displayed in a window using an initial scale factor. At step 1006, an instruction to change the initial scale factor to a next scale factor of a sequence of scale factors can be received. For example, an electronic device can receive a selection of a scale up or scale down option. At step 1008, the electronic device can determine that the next scale factor includes a fit-to-size scale factor. For example, the electronic device can determine that the next scale factor includes a scale factor by which the information is scaled to fit in the window. At step 1010, an auto-resize mode can be associated with the information in response to determining that the next scale factor includes a fit-to-size scale factor. Process 1000 can then end at step 1012.

Figure 11:
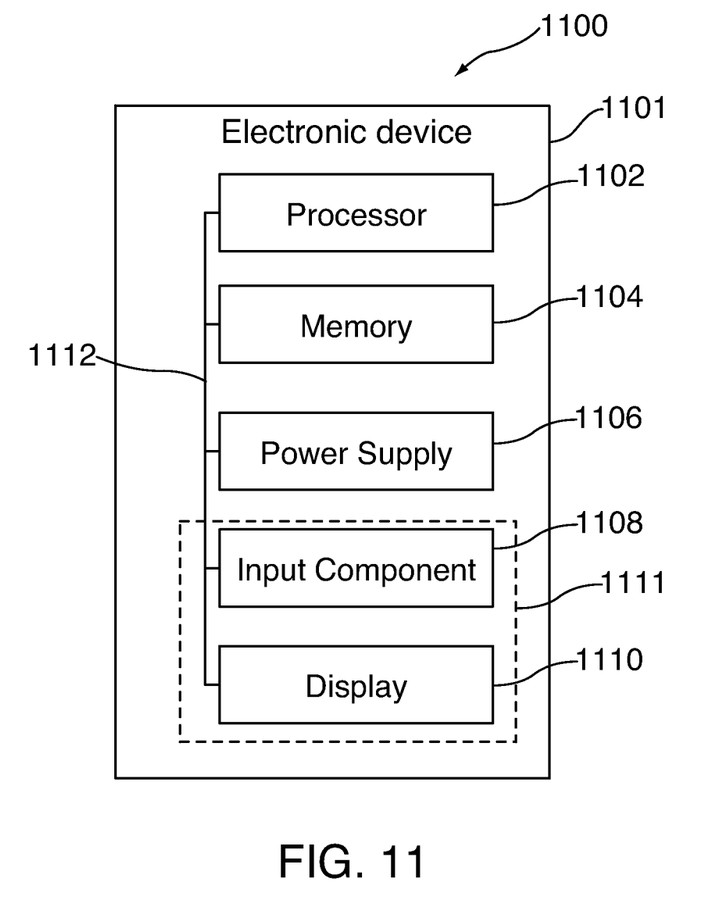
FIG. 11 is a schematic view of an illustrative electronic device for displaying information in a window in accordance with some embodiments of the invention.

Any suitable electronic device can be used to display information in a window using a scale factor. FIG. 11 is a schematic view of an illustrative electronic device 1100 for displaying information in a window in accordance with some embodiments of the invention. Electronic device 1100 may be any portable, mobile, or hand-held electronic device configured to display information in a window using a scale factor to a user wherever the user travels. Alternatively, electronic device 1100 may not be portable at all, but may instead be generally stationary. Electronic device 1100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 1100 may perform a single function (e.g., a device dedicated to displaying information in a window) and, in other embodiments, electronic device 1100 may perform multiple functions (e.g., a device that displays information in a window, plays music, and receives and transmits telephone calls).

Electronic device 1100 may include a processor 1102, memory 1104, power supply 1106, input component 1108, and display 1110. Electronic device 1100 may also include a bus 1112 that may provide one or more wired or wireless communication links or paths for transferring data and/or power to, from, or between various other components of device 1100. In some embodiments, one or more components of electronic device 1100 may be combined or omitted. Moreover, electronic device 1100 may include other components not combined or included in FIG. 11 and/or several instances of one or more of the components shown in FIG. 11.

Memory 1104 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 1104 may include cache memory, which may be one or more different types of memory used for temporarily storing data for electronic device application programs. Memory 1104 may store media data (e.g., music and image files), software (e.g., a boot loader program, one or more application programs of an operating system for implementing functions on device 1100, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 1100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 1106 may provide power to one or more of the components of device 1100. In some embodiments, power supply 1106 can be coupled to a power grid (e.g., when device 1100 is not a portable device, such as a desktop computer). In some embodiments, power supply 1106 can include one or more batteries for providing power (e.g., when device 1100 is a portable device, such as a cellular telephone). As another example, power supply 1106 can be configured to generate power from a natural source (e.g., solar power using solar cells).

One or more input components 1108 may be provided to permit a user to interact or interface with device 1100. For example, input component 1108 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 1108 can be configured to provide one or more dedicated control functions for making selections or issuing commands associated with operating device 1100.

Electronic device 1100 may also include one or more output components that may present information (e.g., visual, audible, and/or tactile information) to a user of device 1100. An output component of electronic device 1100 may take various forms, including, but not limited to, audio speakers, headphones, audio line-outs, visual displays, antennas, infrared ports, rumblers, vibrators, or combinations thereof.

For example, electronic device 1100 may include display 1110 as an output component. Display 1110 may include any suitable type of display or interface for presenting visual content to a user. In some embodiments, display 1110 may include a display embedded in device 1100 or coupled to device 1100 (e.g., a removable display). Display 1110 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 1110 can include a movable display or a projecting system for providing a display of content on a surface remote from electronic device 1100, such as, for example, a video projector, a head-up display, or a three-dimensional (e.g., holographic) display. As another example, display 1110 may include a digital or mechanical viewfinder, such as a viewfinder of the type found in compact digital cameras, reflex cameras, or any other suitable still or video camera. In some embodiments, display 1110 may include display driver circuitry, circuitry for driving display drivers, or both. Display 1110 can be operative to present visual content provided by device 1100.

It should be noted that one or more input components and one or more output components may sometimes be referred to collectively herein as an input/output ("I/O") interface (e.g., input component 1108 and display 1110 as I/O interface 1111). It should also be noted that input component 1108 and display 1110 may sometimes be a single I/O component, such as a touch screen that may receive input information through a user's touch of a display screen and that may also provide visual information to a user via that same display screen.

Electronic device 1100 may also be provided with an enclosure or housing 1101 that may at least partially enclose one or more of the components of device 1100 for protecting them from debris and other degrading forces external to device 1100. In some embodiments, one or more of the components may be provided within its own housing (e.g., input component 1108 may be an independent keyboard or mouse within its own housing that may wirelessly or through a wire communicate with processor 1102, which may be provided within its own housing).

Processor 1102 of device 1100 may include any processing or control circuitry operative to control the operations and performance of one or more components of electronic device 1100. For example, processor 1102 may be used to run operating system applications, firmware applications, media playback applications, media editing applications, or any other application. In some embodiments, processor 1102 may receive input signals from input component 1108 and/or drive output signals through display 1110.

It is to be understood that the steps shown in each one of processes 700-1000 of FIGS. 7-10, respectively, are merely illustrative and that existing steps may be modified or omitted, additional steps may be added, and the order of certain steps may be altered.

Moreover, the processes described with respect to FIGS. 7-10, as well as any other aspects of the invention, may each be implemented in hardware or a combination of hardware and software. Embodiments of the invention can also be embodied as computer-readable code on a computer-readable medium. The computer-readable medium may be any data storage device that can store data which can thereafter be read by a computer system. Examples of the computer-readable medium include read-only memory ("ROM"), random-access memory ("RAM"), CD-ROMs, DVDs, magnetic tape, and optical data storage devices. The computer-readable medium can also be distributed over network-coupled computer systems so that the computer readable code may be stored and executed in a distributed fashion.

Although many of the embodiments of the present invention are described herein with respect to personal computing devices, it should be understood that the present invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for integrating a fit-to-size scale factor in a sequence of scale factors, the method comprising:
   identifying a size of a display window;
   identifying an original size of information to display;
   identifying a sequence of scale factors to provide a user selectable sequence of scale factors;
   determining, from the identified size of the display window and the identified original size of the information, a fit-to-size scale factor;
   integrating the determined fit-to-size scale factor in the identified sequence of scale factors in a position corresponding to consecutively ordered scale factors to update the user selectable sequence of scale factors to include the determined fit-to-scale factor;
   receiving an input to re-size the display window;
   re-sizing the display window; and
   determining a new fit-to-size scale factor based on dimensions of the re-sized window and the identified original size of the information; and
   replacing the determined fit-to-size scale factor in the identified sequence of scale factors with the new fit-to-size scale factor and shifting the new fit-to-size scale factor to a new position within the user selectable sequence of scale factors to maintain consecutively ordered scale factors.

2. The method of claim 1, wherein the integrating comprises integrating the determined fit-to-size scale factor in the identified sequence of scale factors in a consecutive manner.

3. The method of claim 1, further comprising:
   determining that an auto-resize mode is disabled;
   determining that a current scale factor is not the determined fit-to-size scale factor; and
   displaying the information in the re-sized window using the current scale factor.

4. The method of claim 1, further comprising:
   displaying the information in the re-sized window at the predetermined fit-to-scale factor.

5. The method of claim 3, further comprising:
   determining that a current scale factor is not the new fit-to-size scale factor; and
   displaying the information in the re-sized window using the current scale factor.

6. The method of claim 1, further comprising:
   determining that an auto-resize mode is enabled.

7. The method of claim 6, further comprising:
   displaying the information in the re-sized window using the new fit-to-size scale factor.

8. The method of claim 6, further comprising:
   integrating the new fit-to-size scale factor in the sequence of scale factors.

9. The method of claim 1, further comprising:
   determining that a current scale factor is the determined fit-to-size scale factor; and
   associating an auto-resize mode with the information.

10. An electronic device comprising:
    a display;
    an input interface; and
    control circuitry operative to:
        provide a window on the display in which to display information;
        display the information using an initial scale factor in the window;
        receive an input from the input interface to step to a next scale factor in a sequence of scale factors;
        determine that a fit-to-size scale factor associated with the window and with the information is between the initial scale factor and the next scale factor; and
        display the information using the fit-to-size scale factor in the window.

11. The electronic device of claim 10, wherein the control circuitry is further operative to:
    determine that the fit-to-size scale factor is not between the initial scale factor and the next factor; and
    display the information using the next scale factor.

12. The electronic device of claim 10, wherein the control circuitry is further operative to:
    receive an input to increase the scale factor of the displayed information.

13. The electronic device of claim 10, wherein the control circuitry is further operative to:
    receive an input to decrease the scale factor of the displayed information.

14. The electronic device of claim 10, wherein the control circuitry is further operative to:
    receive an input from the input interface to re-size the window;
    re-size the window on the display;
    identify a new fit-to-size scale factor associated with the re-sized window and with the information; and
    display the information using the new fit-to-size scale factor in the re-sized window.

15. The electronic device of claim 10, wherein the control circuitry is further operative to:
    determine that the information is displayed in the window using the fit-to-size scale factor; and
    associate an auto-resize mode with the information.

16. A method for iterating through a sequence of scale factors, the method comprising:
    displaying information in a window using an initial scale factor;
    receiving an instruction to change the initial scale factor to a next scale factor of a sequence of scale factors that provide a user selectable sequence of consecutively ordered scale factors;
    determining that the next scale factor comprises a fit-to-size scale factor; and
    associating an auto-resize mode with the information in response to determining that the next scale factor comprises the fit-to-size scale factor, wherein the auto-resize mode is maintained by changing the fit-to-size scale factor in response to any changes in size to a dimension of the window, and further wherein a position of the fit-to-size scale position in the user selectable sequence of consecutively ordered scale factors is updated in response to any changes to the fit-to-size scale factor.

17. The method of claim 16, further comprising:
receiving a subsequent instruction to change the next scale factor to a subsequent scale factor of the sequence of scale factors; and
disassociating the information with the auto-resize mode in response to receiving the subsequent instruction.

18. The method of claim 16, further comprising:
receiving an instruction to re-size the window;
re-sizing the window in response to the instruction;
determining that the auto-resize mode is associated with the information;
identifying a new fit-to-size scale factor associated with the re-sized window and the information; and
displaying the information in the re-sized window using the new fit-to-size scale factor.

19. The method of claim 16, further comprising:
integrating the fit-to-size scale factor in the sequence of scale factors.

20. A non-transitory computer-readable medium for integrating a fit-to-size scale factor in a sequence of scale factors, the computer-readable medium comprising computer program logic recorded thereon for:
identifying a size of a display window;
identifying an original size of information to display;
identifying a sequence of scale factors describing a scale at which information is displayed to provide a user selectable sequence of scale factors, wherein the sequence of scale factors is stepped through in response to receiving an instruction;
determining, from the identified size of the display window and the identified original size of the information, a fit-to-size scale factor;
integrating the determined fit-to-size scale factor in the identified sequence of scale factors in a position corresponding to consecutively ordered scale factors to update the user selectable sequence of scale factors to include the determined fit-to-scale factor;
receiving an input to re-size the display window;
re-sizing the display window; and
determining a new fit-to-size scale factor based on dimensions of the re-sized window and the identified original size of the information; and
replacing the determined fit-to-size scale factor in the identified sequence of scale factors with the new fit-to-size scale factor and shifting the new fit-to-size scale factor to a new position within the user selectable sequence of scale factors to maintain consecutively ordered scale factors.

* * * * *